United States Patent
Park et al.

(10) Patent No.: US 11,122,267 B2
(45) Date of Patent: Sep. 14, 2021

(54) METHOD AND APPARATUS FOR ENCODING IMAGE BY USING QUANTIZATION TABLE ADAPTIVE TO IMAGE

(71) Applicant: SAMSUNG ELECTRONICS CO., LTD., Suwon-si (KR)

(72) Inventors: Pilkyu Park, Suwon-si (KR); Kiljong Kim, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/671,286

(22) Filed: Nov. 1, 2019

(65) Prior Publication Data

US 2020/0145662 A1    May 7, 2020

(30) Foreign Application Priority Data

Nov. 1, 2018   (KR) .................. 10-2018-0133137

(51) Int. Cl.
*H04N 19/124* (2014.01)
*H04N 19/196* (2014.01)
(Continued)

(52) U.S. Cl.
CPC ......... *H04N 19/124* (2014.11); *G06K 9/6268* (2013.01); *G06N 3/08* (2013.01);
(Continued)

(58) Field of Classification Search
None
See application file for complete search history.

(56) References Cited

U.S. PATENT DOCUMENTS 5,867,593 A * 2/1999 Fukuda .............. H04N 1/40062
                                                     382/176
2004/0150538 A1* 8/2004 Kim ..................... H04N 19/436
                                                     341/67

(Continued)

FOREIGN PATENT DOCUMENTS

WO   WO 2020/019236   * 1/2020 ............... G06N 3/08

OTHER PUBLICATIONS

J. Sole et al., "Transform Coefficient Coding in HEVC," in IEEE Transactions on Circuits and Systems for Video Technology, vol. 22, No. 12, pp. 1765-1777, Dec. 2012, doi: 10.1109/TCSVT.2012. 2223055. (Year: 2012).*

(Continued)

*Primary Examiner* — Stefan Gadomski
(74) *Attorney, Agent, or Firm* — Sughrue Mion, PLLC

(57) ABSTRACT

Provided is a method of encoding an image, the method including: obtaining a plurality of patches from the image; obtaining a plurality of transform coefficient groups respectively corresponding to the plurality of patches; inputting, to a machine learning model, input values corresponding to transform coefficients included in each of the plurality of transform coefficient groups; quantizing transform coefficients corresponding to the image by using a quantization table output from the machine learning model; and generating a bitstream including data generated as a result of the quantizing and information about the quantization table.

17 Claims, 14 Drawing Sheets

(51) Int. Cl.
  *H04N 19/119* (2014.01)
  *G06K 9/62* (2006.01)
  *G06N 3/08* (2006.01)
  *G06N 20/10* (2019.01)
  *H04N 19/176* (2014.01)

(52) U.S. Cl.
  CPC .......... *G06N 20/10* (2019.01); *H04N 19/119* (2014.11); *H04N 19/176* (2014.11); *H04N 19/196* (2014.11)

(56) References Cited

U.S. PATENT DOCUMENTS

| | | | | |
|---|---|---|---|---|
| 2017/0013260 A1* | 1/2017 | Valin | ................... | H04N 19/136 |
| 2017/0048481 A1* | 2/2017 | Ryu | ................... | H04N 19/10 |
| 2017/0118492 A1* | 4/2017 | Sakamoto | ................... | H04N 19/115 |
| 2017/0132511 A1* | 5/2017 | Gong | ................... | G06Q 50/01 |
| 2017/0280139 A1* | 9/2017 | Thirumalai | ................... | H04N 19/105 |
| 2018/0046894 A1* | 2/2018 | Yao | ................... | G06F 7/5443 |
| 2018/0063526 A1 | 3/2018 | Choi et al. | | |
| 2018/0152709 A1* | 5/2018 | Lay | ................... | H04N 19/124 |
| 2019/0043201 A1* | 2/2019 | Strong | ................... | G06K 9/00624 |
| 2019/0050710 A1* | 2/2019 | Wang | ................... | G06N 3/063 |
| 2019/0073582 A1* | 3/2019 | Yang | ................... | G06F 17/11 |
| 2019/0122116 A1* | 4/2019 | Choi | ................... | G06N 3/084 |
| 2019/0188554 A1* | 6/2019 | Ma | ................... | G06N 3/082 |
| 2019/0206090 A1* | 7/2019 | Ray | ................... | G06F 12/023 |
| 2019/0251418 A1* | 8/2019 | Nakanishi | ................... | G06N 3/0454 |
| 2019/0251445 A1* | 8/2019 | Movshovitz-Attias | ................... | G06N 3/08 |
| 2019/0327479 A1* | 10/2019 | Chen | ................... | H04N 19/172 |
| 2020/0057934 A1* | 2/2020 | Yoo | ................... | G06K 9/6262 |
| 2020/0184318 A1* | 6/2020 | Minezawa | ................... | G06K 9/38 |

OTHER PUBLICATIONS

Ballé, Johannes & Laparra, Valero & Simoncelli, Eero. (2016). End-to-end Optimized Image Compression. (Year: 2016).*

Liu D., Ma H., Xiong Z., Wu F. (2018) CNN-Based DCT-Like Transform for Image Compression. In: Schoeffmann K. et al. (eds) MultiMedia Modeling. MMM 2018. Lecture Notes in Computer Science, vol. 10705. Springer, Cham, https://doi.org/10.1007/978-3-319-73600-6_6 (Year: 2018).*

T. Chen, H. Liu, Q. Shen, T. Yue, X. Cao and Z. Ma, "DeepCoder: A deep neural network based video compression," 2017 IEEE Visual Communications and Image Processing (VCIP), St. Petersburg, FL, USA, 2017, pp. 1-4, doi: 10.1109/VCIP.2017.8305033. (Year: 2017).*

* cited by examiner

FIG. 12

| 1.00 | 1.00 | 1.00 | 1.00 | 1.15 | 1.31 | 1.65 | 2.25 |
|------|------|------|------|------|------|------|------|
| 1.00 | 1.00 | 1.00 | 1.00 | 1.15 | 1.47 | 1.84 | 2.47 |
| 1.00 | 1.00 | 1.15 | 1.31 | 1.47 | 1.84 | 2.47 | 3.19 |
| 1.00 | 1.00 | 1.31 | 1.65 | 2.25 | 2.94 | 3.72 | 4.90 |
| 1.15 | 1.15 | 1.47 | 2.25 | 3.45 | 4.90 | 6.61 | 8.58 |
| 1.31 | 1.47 | 1.84 | 2.94 | 4.90 | 7.76 | 11.27 | 16.00 |
| 1.65 | 1.84 | 2.47 | 3.72 | 6.61 | 11.27 | 18.98 | 30.25 |
| 2.25 | 2.47 | 3.19 | 4.90 | 8.58 | 16.00 | 30.25 | 52.05 |

$T_{ij}$

METHOD AND APPARATUS FOR ENCODING IMAGE BY USING QUANTIZATION TABLE ADAPTIVE TO IMAGE

CROSS-REFERENCE TO RELATED APPLICATION(S)

This application is based on and claims priority under 35 U.S.C. § 119 to Korean Patent Application No. 10-2018-0133137, filed on Nov. 1, 2018, in the Korean Intellectual Property Office, the disclosure of which is incorporated by reference herein in its entirety.

BACKGROUND

1. Field

The disclosure relates to a method and apparatus for encoding an image by using a quantization table adaptively generated for an image to be encoded.

2. Description of Related Art

As hardware for reproducing and storing high-resolution or high-quality video content is developed and supplied, a need for compression methods for effectively encoding and/or decoding the high-resolution or high-quality video content has increased.

For example, in the case of a digital image signal, the amount of information can be massive, and thus, compression of image data is required to perform storage, search, transmission, etc., of the information more efficiently.

Accordingly, many compression techniques for image data have been developed. Among the image compression techniques, the Joint Photographic Experts Group (JPEG) scheme, which is an international standard of a still image compression method, has been used. The JPEG method is a widely compatible image compression method but has problems such as low compression compared with other image compression methods.

SUMMARY

Provided are an encoding apparatus and method of encoding an image using a quantization table adaptive to the image, whereby an image is encoded to have high resolution compared to a low bitrate.

Additional aspects will be set forth in part in the description which follows and, in part, will be apparent from the description, or may be learned by practice of the presented embodiments.

In accordance with an aspect of the disclosure, a method of encoding an image includes: obtaining a plurality of patches from the image; obtaining a plurality of transform coefficient groups respectively corresponding to the plurality of patches; inputting, to a machine learning model, input values corresponding to transform coefficients included in each of the plurality of transform coefficient groups; quantizing transform coefficients corresponding to the image by using a quantization table output from the machine learning model; and generating a bitstream including data generated as a result of the quantizing and information about the quantization table.

The machine learning model may include a first fully connected layer (FCL) receiving the input values and a second FCL outputting element values included in the quantization table; and a number of input nodes of the first FCL may correspond to a number of the input values, and a number of output nodes of the second FCL may correspond to a number of elements included in the quantization table.

The obtaining the plurality of patches may include obtaining the plurality of patches by splitting the image into split regions of a predetermined size.

Adjacent split regions, among the split regions of the predetermined size, adjacent to each other in the image may partially overlap.

The obtaining the plurality of patches may include obtaining the plurality of patches by alternately allocating pixels included in the image to the plurality of patches, respectively, in a predetermined order.

The method may further include classifying the transform coefficients included in each of the plurality of transform coefficient groups according to locations of the transform coefficients within each of the transform coefficient groups and obtaining the input values based on the classified transform coefficients.

The obtaining the input values may include obtaining at least one of a maximum value, a minimum value, or an average value of the classified transform coefficients from each of the locations in the transformation coefficient groups as the input values.

The machine learning model may be trained to decrease a first loss value calculated, after quantizing and inversely quantizing training transform coefficients corresponding to a training image by using a training quantization table, based on a difference between the training transform coefficients before the quantizing and the inversely quantized training transform coefficients; and the training quantization table may be obtained by inputting training input values corresponding to the training image to the machine learning model.

The machine learning model may be trained to decrease a second loss value calculated, after quantizing and inversely quantizing training transform coefficients corresponding to a training image by using a training quantization table and reconstructing the training image by inversely transforming the inversely quantized training transform coefficients into pieces of data in a spatial domain, based on a difference between the reconstructed training image and the training image; and the training quantization table may be obtained by inputting training input values corresponding to the training image to the machine learning model.

The machine learning model may be trained to decrease a third loss value calculated, after quantizing training transform coefficients corresponding to a training image by using a training quantization table, based on whether the quantized training transform coefficients are 0 or not; and the training quantization table may be obtained by inputting training input values corresponding to the training image to the machine learning model.

Based on the quantized training transform coefficients not being 0, the third loss value may increase in a direction from low frequency to high frequency.

The machine learning model may include: a first sub-model configured to receive the input values and output a predictive quantization table; and a second sub-model configured to receive a result of quantizing and inversely quantizing the input values with the predictive quantization table and the input values and outputting the quantization table.

In accordance with another aspect of the disclosure, a method of encoding an image includes: inputting, to a machine learning model, at least one piece of two-dimensional data corresponding to the image; quantizing transform coefficients corresponding to the image by using a quantization table output from the machine learning model; and generating a bitstream including data generated as a result of the quantizing and information about the quantization table, wherein the machine learning model includes a convolution neural network (CNN) including a plurality of convolution layers performing convolution processing on input data by using a filter kernel.

The method may further include: based on a size of the two-dimensional data being different from a predetermined size, downsampling or upsampling the two-dimensional data.

The inputting of the at least one piece of two-dimensional data may include: inputting the at least one piece of two-dimensional data to a machine learning model corresponding to a size of the two-dimensional data, from among a plurality of machine learning models.

In accordance with another aspect of the disclosure, an apparatus for encoding an image, includes: at least one memory storing a machine learning model and at least one instruction; and at least one processor configured to execute the at least one instruction to: obtain a plurality of patches from the image; obtain a plurality of transform coefficient groups respectively corresponding to the plurality of patches; input, to the machine learning model, input values corresponding to transform coefficients included in each of the plurality of transform coefficient groups; quantize transform coefficients corresponding to the image by using a quantization table output from the machine learning model; and generate a bitstream including data generated as a result of the quantizing and information about the quantization table.

The machine learning model may include a first fully connected layer (FCL) receiving the input values and a second FCL outputting element values included in the quantization table; and a number of input nodes of the first FCL may correspond to a number of the input values, and a number of output nodes of the second FCL may correspond to a number of elements included in the quantization table.

The at least one processor may be further configured to execute the at least one instruction to obtain the plurality of patches by splitting the image into split regions of a predetermined size.

The at least one processor may be further configured to execute the at least one instruction to obtain the plurality of patches by alternately allocating pixels included in the image to the plurality of patches, respectively, in a predetermined order.

The at least one processor may be further configured to execute the at least one instruction to classify the transform coefficients included in each of the plurality of transform coefficient groups according to locations of the transform coefficients within each of the transform coefficient groups and obtain the input values based on the classified transform coefficients.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 is a diagram illustrating a weight table for use in training of a machine learning model, according to an embodiment;

DETAILED DESCRIPTION

Figure 1:
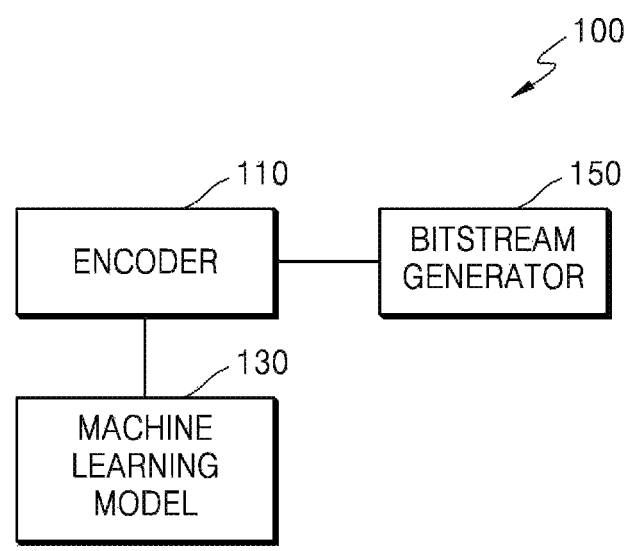
FIG. 1 is a block diagram illustrating configurations of an image encoding apparatus according to an embodiment.

As the disclosure allows for various changes and numerous embodiments, certain embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

In the description of embodiments, numerals (e.g., "first," "second," and the like) are used only to distinguish one element from another element.

It will be understood that, when an element is referred to as being "connected" or "coupled" to another element, the element can be directly connected or coupled to the other element or, unless otherwise described, an intervening element may be present.

The element "—er, —or, —r (—unit)," "module," etc., described herein may have two or more elements combined into one or may have one element divided into two or more for each specialized function. Each element described below may additionally perform some or all of the functions of another element as well as its own main function, and some of the main functions of each element may be performed wholly by another element.

An "image" or a "picture" described herein may indicate a still image or a moving picture.

A "sample" or a "signal" described herein is data allocated to a sampling location of an image and means data to be processed. For example, pixel values of an image in a spatial domain and transform coefficients in a transform domain may be samples. A unit including at least one of the samples may be called a block.

The block described herein may have a square or rectangle shape or may have any geometric shape. Although the block may have a size of 8×8, the disclosure is not limited thereto.

Throughout the disclosure, expressions such as "at least one of a, b or c" and "at least one of a, b and c" indicates only a, only b, only c, both a and b, both a and c, both b and c, all of a, b, and c, or variations thereof.

Hereinafter, embodiments will be sequentially described in detail.

During encoding processes based on the Joint Photographic Experts Group (JPEG) scheme, an image is transformed into a transform coefficient through frequency transform processes performed with respect to blocks, and quantization using a quantization table is performed on the transform coefficient. The quantized transform coefficient may be output as a bitstream through entropy encoding processes. In addition, during decoding processes, the quantized transform coefficient may be extracted from the bitstream through entropy decoding, and inverse-quantization and inverse-transform processes may be performed on the quantized transform coefficient to reconstruct the image. According to the JPEG standard, a discrete cosine transform is performed on an image with respect to blocks of an 8×8 size, and quantization using a quantization table of an 8×8 size is performed on transform coefficients. Unintended degradation of picture quality, however, may be caused because element values included in the quantization table are not optimized for the image to be encoded.

In an image encoding method according to one or more embodiments, a quantization table matching characteristics of an image may be generated through a machine learning model, and thus, a bitrate of a bitstream may be decreased and degradation of image quality due to quantization may be prevented.

FIG. 1 is a block diagram illustrating configurations of an image encoding apparatus 100 according to an embodiment.

Referring to FIG. 1, the image encoding apparatus 100 according to an embodiment may include an encoder 110, a machine learning model 130, and a bitstream generator 150.

The encoder 110 may generate a quantization table matching characteristics of an image to be encoded by using the machine learning model 130. The encoder 110 may perform frequency transform on an image and may quantize transform coefficients into a quantization table. For example, the encoder 110 may perform frequency transform on an image with respect to blocks of a predetermined size (for example, 8×8) and may quantize transform coefficients into a quantization table. The encoder 110 may perform a discrete cosine transform on an image, although it is understood that a frequency transform method is not limited to the discrete cosine transform in one or more other embodiments.

The bitstream generator 150 may generate a bitstream corresponding to a result of encoding an image. According to an embodiment, the bitstream generator 150 may generate a bitstream including data generated as a result of quantization performed by the encoder 110 and information about a quantization table.

The encoder 110 and the bitstream generator 150 according to an embodiment may be implemented as at least one processor, and may perform an encoding operation of an image as at least one program or instruction stored in a memory is executed. In addition, the machine learning model 130 may be stored in the memory.

The image encoding apparatus 100 according to an embodiment may include a central processor for controlling the encoder 110 and the bitstream generator 150. Alternatively, the encoder 110 and the bitstream generator 150 may be driven by an individual processor, and the image encoding apparatus 100 may operate as a whole as individual processors mutually operate. Alternatively, the encoder 110 and the bitstream generator 150 may be controlled by the control of an external processor.

The image encoding apparatus 100 may include one or more data storing units in which input data and output data of the encoder 110 and the bitstream generator 150 are stored. The image encoding apparatus 100 may include a memory controller for controlling data input and output of the data storing unit.

To encode an image, the image encoding apparatus 100 may perform an image encoding operation by jointly operating with an internal encoding processor or an external encoding processor. An internal encoding processor of the image encoding apparatus 100 according to an embodiment may perform basic image encoding operations as an individual processor. Also, the image encoding apparatus 100, a central operating apparatus, or a graphic operating apparatus may include an image encoding processing module to perform the basic image encoding operations.

Figure 2:
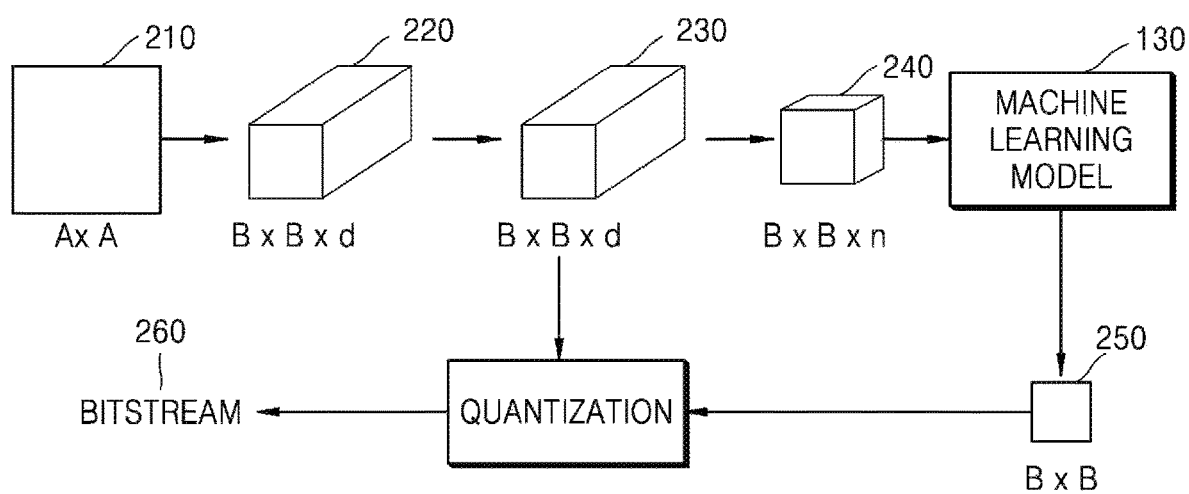
FIG. 2 is a diagram for explaining a generating method of a quantization table, according to an embodiment.

FIG. 2 is a diagram for explaining a generating method of a quantization table, according to an embodiment.

When an image 210 to be encoded is input, the encoder 110 may obtain a plurality of patches 220 of a predetermined size from the image 210. A size of each patch 220 may be smaller than that of the image 210. Referring to FIG. 2, the plurality of patches 220 of a B×B size may be obtained from the image 210 of an A×A size. In FIG. 2, d may denote a depth and may correspond to the number of the plurality of patches 220.

Figure 3:
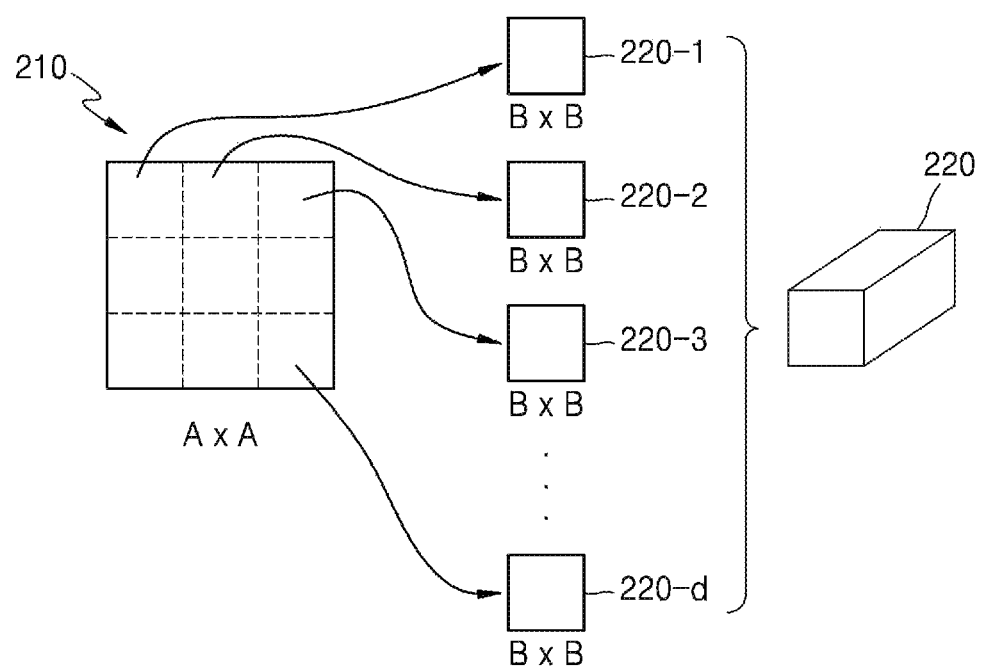
FIG. 3 is a diagram for explaining a method of obtaining a plurality of patches from an image, according to an embodiment.

There may be various methods of obtaining the plurality of patches 220. According to an embodiment, as shown in FIG. 3, the encoder 110 may split the image 210 into a predetermined size (for example, 8×8) and may extract therefrom regions of the predetermined size in the image 210 as patches, for example, first to $d^{th}$ patches 220-1, 220-2, 220-3, . . . , 220-d, respectively. For example, when a size of the image 210 is 240×240, and a size of a patch is 8×8, the encoder 110 may split the image 210 of a 240×240 size into 8×8 patches and extract therefrom a total of 900 patches 220.

Figure 4:
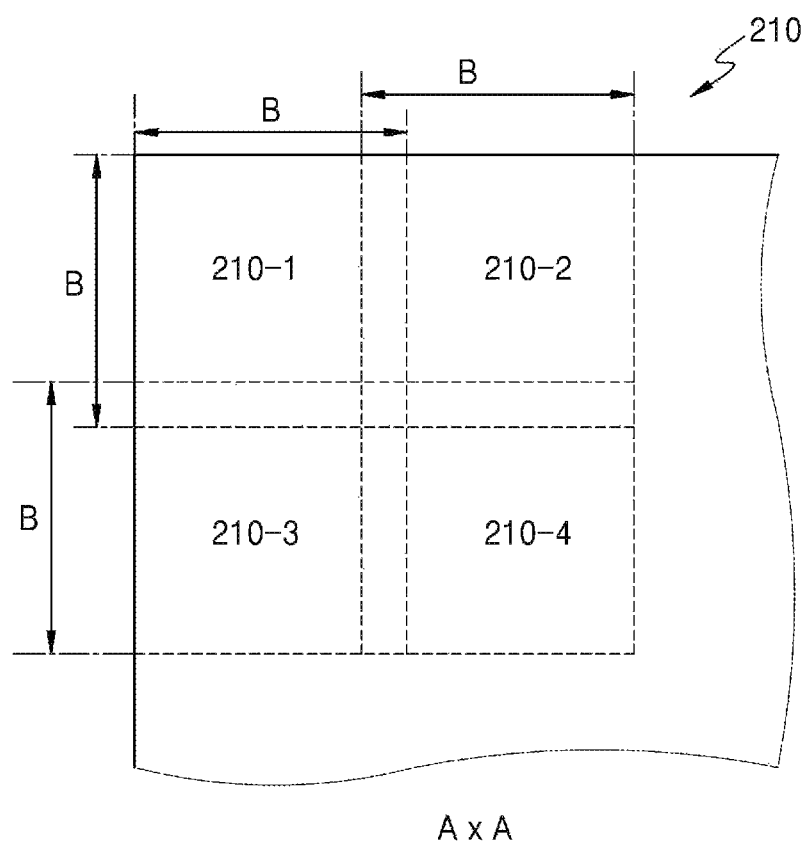
FIG. 4 is a diagram for explaining a method of obtaining a plurality of patches from an image, according to another embodiment.

According to an embodiment, as shown in FIG. 4, the encoder 110 may split the image 210 into a predetermined size (B×B) so that adjacent regions in the image 210 partially overlap and may extract therefrom split regions as patches, respectively. Referring to FIG. 4, it may be found that a portion of a region 210-1 in the image 210 overlaps regions 210-2, 210-3, and 210-4 adjacent thereto.

In FIG. 3, when a size of the image 210 is 240×240, and a size of a patch is 8×8, the total of 900 patches 220 may be extracted therefrom. According to another embodiment, as shown in FIG. 4, when the image 210 is split so that adjacent regions in the image 210 partially overlap, more than 900 patches may be extracted therefrom.

According to an embodiment, the encoder 110 may obtain the plurality of patches 220 by allocating pixels included in the image 210 to each of the plurality of patches 220. For example, when a size of the image 210 is 240×240, and a size of a patch is 8×8, 240×240 pixels in the image 210 may be classified into 900 groups in various ways, and patches having pixels included in each group may be obtained.

Figure 5:
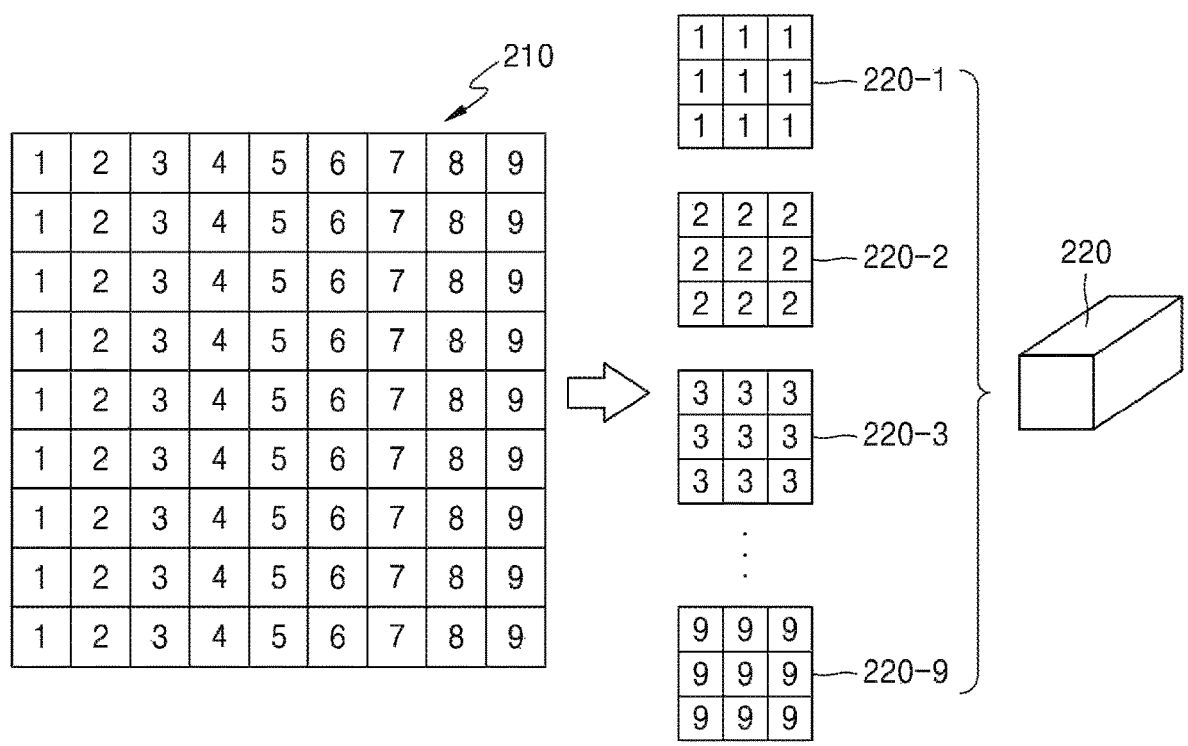
FIG. 5 is a diagram for explaining a method of obtaining a plurality of patches from an image, according to another embodiment.

By way of example, the encoder 110 may obtain the plurality of patches 220 by alternately allocating pixels included in the image 210 to each of the plurality of patches 220. Referring to FIG. 5, when a size of the image 210 is 9×9, and a size of a patch is 3×3, a total of 9 patches 220 are to be generated. Accordingly, the encoder 110 may alternately allocate pixels included in the image 210 in order of the first patch 220-1 to a ninth patch 220-9.

In FIG. 5, numbers allocated to pixels in the image 210 may denote numbers of patches to which the pixels are to be allocated. For example, in the image 210, pixels denoted by 1 may be pixels that will be included in the first patch 220-1 and pixels denoted by 2 may be pixels that will be included in the second patch 220-2. As shown in FIGS. 3 and 4, when the image 210 is split into a predetermined size, each patch has only local characteristics of the image 210 and thus may not show the entire characteristics of the image 210. Taking this issue into account, as shown in FIG. 5, by alternately allocating pixels in the image 210 to each of the plurality of patches 220, each patch may be allowed to have the entire characteristics of the image 210.

Referring back to FIG. 2, the encoder 110 performs frequency transform on each of the plurality of patches 220 and generates a plurality of transform coefficient groups 230. A size of a two-dimensional (2D) transform coefficient group may be the same as that of a patch. For example, when a size of a patch is 8×8, a corresponding transform coefficient group may also have a size of 8×8 (64 transform coefficients). By way of example, the encoder 110 may perform a discrete cosine transform on each of the plurality of patches 220.

The encoder 110 obtains input values 240, which will be input to the machine learning model 130, by using transform coefficients included in the plurality of transform coefficient groups 230. The number of the input values 240 may be less than that of the transform coefficients included in the plurality of transform coefficient groups 230. In an embodiment, transform coefficients themselves included in the plurality of transform coefficient groups 230 may be input values and may be input to the machine learning model 130.

A reason for obtaining, by using transform coefficients included in the plurality of transform coefficient groups 230, the input values 240 fewer than the transform coefficients is to constantly maintain the number of pieces of data that will be input to the machine learning model 130. Accordingly, when the number of transform coefficients included in the plurality of transform coefficient groups 230 corresponds to a pre-set number, there is no need to decrease the number of the transform coefficients.

As described below, the machine learning model 130 according to an embodiment may include an input layer for receiving the input values 240, and the input layer may be a fully connected layer (FCL). There is a need for limiting the number of the input values 240 to be the same as the number of input nodes because the FCL has a predetermined number of input nodes.

In an embodiment, the encoder 110 may classify transform coefficients included in each of the plurality of transform coefficient groups 230 according to each of locations within the transform coefficient group and then may obtain the input values 240 based on the transform coefficients classified according to each location. For example, at least one of a maximum value, a minimum value, or an average value of the transform coefficients classified according to each location may be obtained as the input values 240. For example, maximum values between transform coefficients located at the same position from among transform coefficients included in each of the plurality of transform coefficient groups 230 may be input to the machine learning model 130 as the input values 240.

Figure 6:
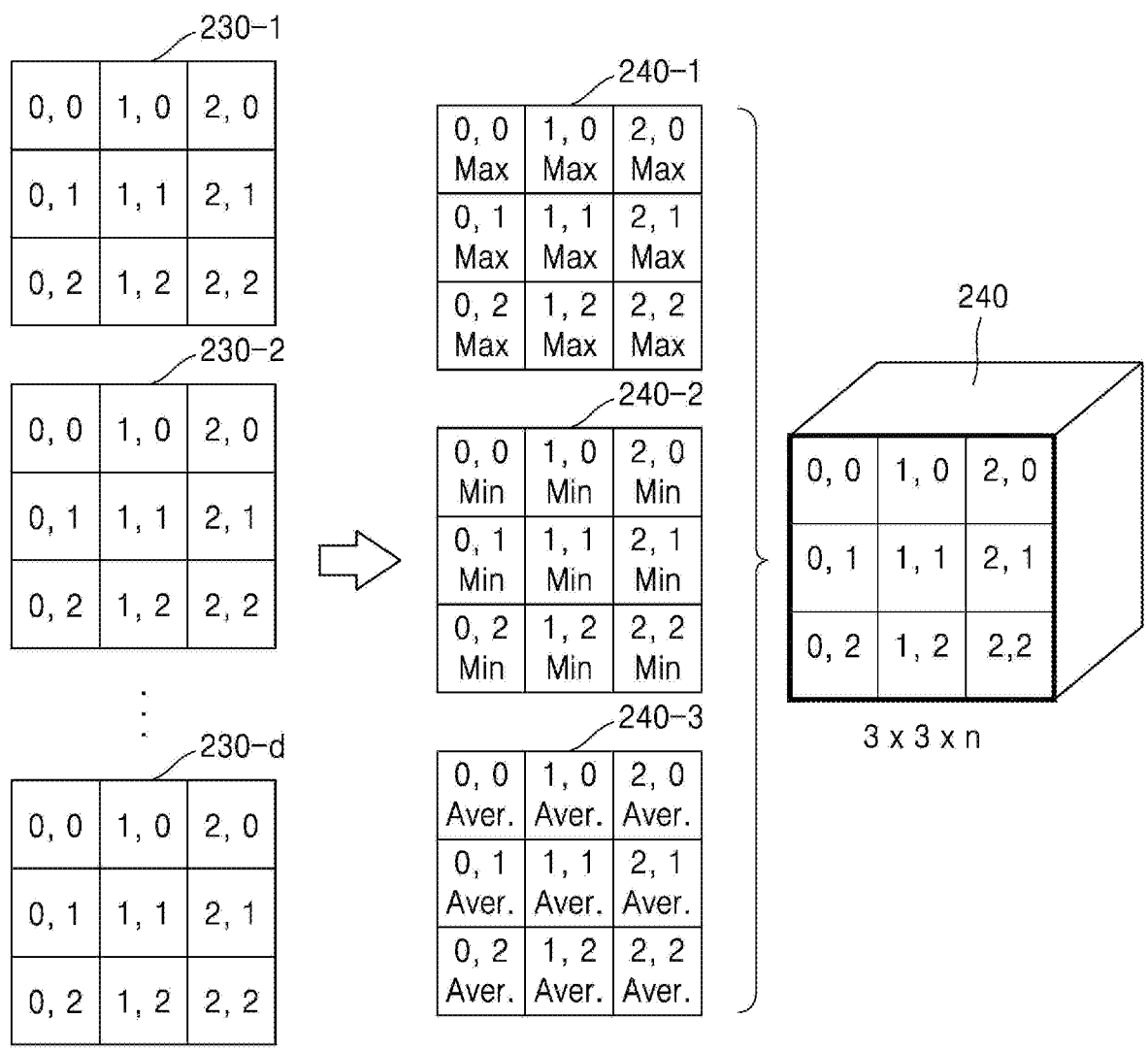
FIG. 6 is a diagram for explaining a method of obtaining input values, which will be input to a machine learning model, from a plurality of transform coefficient groups.

Referring to FIG. 6, at least one of a maximum value, a minimum value, or an average value between transform coefficients located at (0,0) from among transform coefficients included in each of transform coefficient groups 23-1, 230-2, . . . , 230-d may be allocated as an input value of a first row and a first column. In FIG. 6, n, which denotes a depth of the input values 240, may be 1 when one of a maximum value 240-1, a minimum value 240-2, and an average value 240-3 is used as input values, may be 2 when two of the maximum value 240-1, the minimum value 240-2, and the average value 240-3 are used as input values, and may be 3 when all of the maximum value 240-1, the minimum value 240-2, and the average value 240-3 are used as input values.

When a size of a transform coefficient group is B×B, and the number of the transform coefficient group is d, each of maximum values 240-1, minimum values 240-2, and average values 240-3 of transform coefficients located at the same position in respective transform coefficient groups is two-dimensional, and thus, a size thereof is B×B. In an embodiment, the encoder 110 may obtain the input values 240 as many as input nodes of the input layer of the machine learning model 130. For example, when the number of input nodes of the input layer of the machine learning model 130 is B×B, the encoder 110 may obtain the maximum values 240-1, the minimum values 240-2, or the average values 240-3 of transform coefficients located at the same position in respective transform coefficient groups as the input values 240, and when the number of input nodes of the input layer of the machine learning model 130 is B×B×2, the encoder 110 may obtain the maximum values 240-1 and the minimum values 240-2, the maximum values 240-1 and the average values 240-3, or the minimum values 240-2 and the average values 240-3 from among the maximum values 240-1, the minimum values 240-2, and the average values 240-3 of transform coefficients located at the same position in respective transform coefficient groups as the input values 240. When the number of input nodes of the input layer of the machine learning model 130 is B×B×3, the encoder 110 may obtain all of the maximum values 240-1, the minimum values 240-2, and the average values 240-3 of transform coefficients located at the same position in respective transform coefficient groups as the input values 240.

According to an embodiment, in addition to using a maximum value, a minimum value, and an average value of transform coefficients located at the same position in respective transform coefficient groups as the input values 240, the encoder 110 may obtain the input values 240 by applying the transform coefficients located at the same position to a predetermined formula.

The encoder 110 may downsample or upsample the number of transform coefficients included in transform coefficient groups to adjust the number of the input values 240. For example, the encoder 110 may transform the image 210 through a related art frequency transform method, and then, when the number of transform coefficients is greater than a pre-set number allowed to be input to the machine learning model 130, may perform downsampling for decreasing the number of transform coefficients so that the number of transform coefficients is the same as the pre-set number. In addition, for example, the encoder 110 may transform the image 210 through a frequency transform method of the related art, and then, when the number of transform coefficients is less than a pre-set number allowed to be input to the machine learning model 130, may perform upsampling for increasing the number of transform coefficients so that the number of transform coefficients is the same as the pre-set number.

Referring back to FIG. 2, when the input values 240 are input to the machine learning model 130, the machine learning model 130 processes the input values 240 according to a previously trained weight and outputs a quantization table of a predetermined size (for example, 8×8). The input values 240 are generated as two-dimensional data in FIG. 6, etc. When input to the machine learning model 130, however, the input values 240 may be input as one-dimensional data according to an order in which respective input values are arranged two-dimensionally. Although FIG. 2 illustrates an embodiment in which a quantization table 250 corresponding to one image 210 is generated, input values 240 corresponding to a plurality of images 210 may be input to the machine learning model 130 in a batch, and thus, a plurality of quantization tables 250 respectively corresponding to the plurality of images 210 may be generated.

The encoder 110 quantizes transform coefficients corresponding to the image 210 by using the quantization table 250 output from the machine learning model 130. In an example, the encoder 110 may quantize the plurality of transform coefficient groups 230 generated by performing frequency transform on the plurality of patches 220 corresponding to the image 210 by using the quantization table 250.

The bitstream generator 150 may generate a bitstream including data generated as a result of quantization and information about the quantization table 250 output from the machine learning model 130. The bitstream generator 150 may perform entropy coding on data generated as a result of quantization and information about the quantization table 250 output from the machine learning model 130 to generate a bitstream.

According to an embodiment, the encoder 110 may generate a first quantization table for luminance components of pixels of the image 210 and a second quantization table for chrominance components of pixels of the image 210. The encoder 110 may then quantize transform coefficients corresponding to luminance components of pixels of the image 210 by using the first quantization table and may quantize transform coefficients corresponding to chrominance components of pixels of the image 210 by using the second quantization table. The encoder 110 may input input values 240 generated based on luminance components of pixels in the image 210 to the machine learning model 130 and may input input values 240 generated based on chrominance components of pixels in the image 210 to the machine learning model 130 to generate a first quantization table and a second quantization table.

In addition, the encoder 110 may generate a first quantization table and a second quantization table by inputting each of two-dimensional data corresponding to luminance components of the image 210 and two-dimensional data corresponding to chrominance components of the image 210 to a machine learning model having a convolution neural network (CNN) structure described below.

Hereinafter, a structure of the machine learning model 130 will be described in detail with reference to FIGS. 7 to 10.

Figure 7:
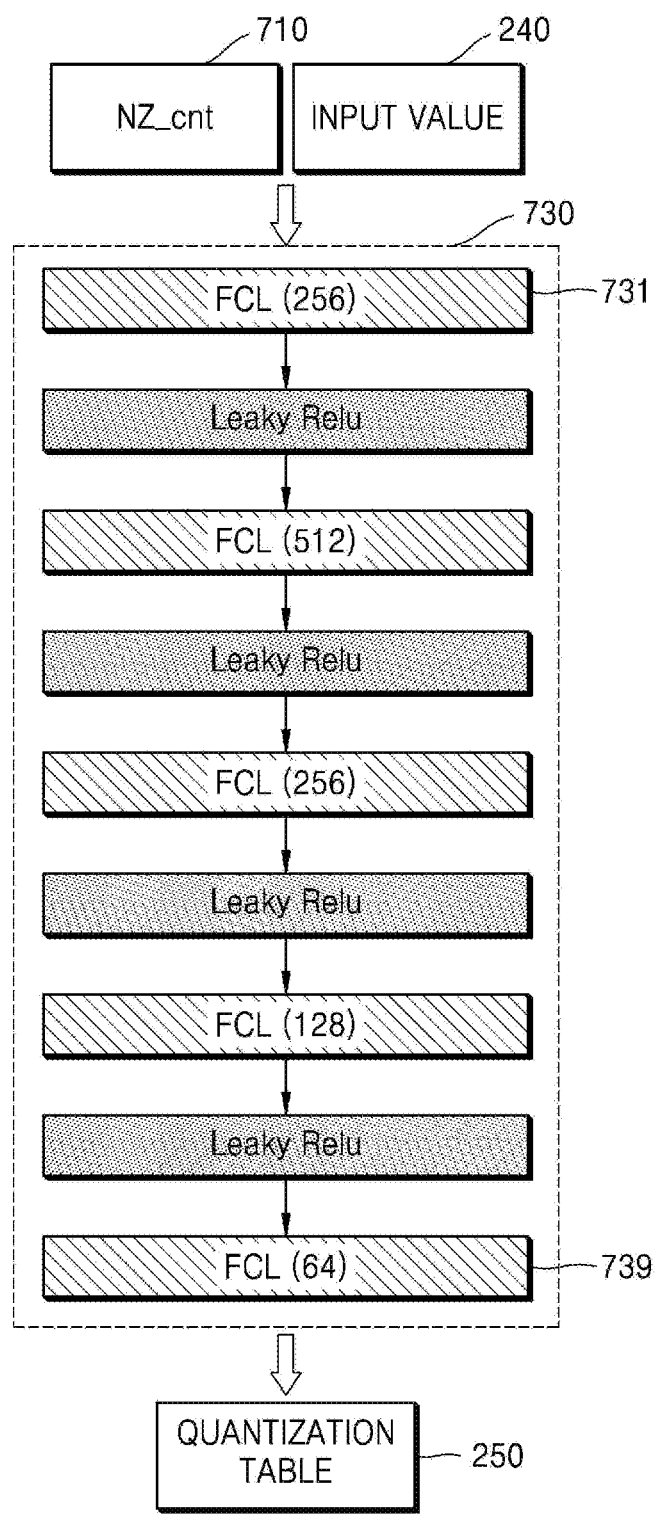
FIG. 7 is a diagram for explaining a structure of a machine learning model according to an embodiment.

FIG. 7 is a diagram for explaining a structure of a machine learning model 730 according to an embodiment.

Referring to FIG. 7, the machine learning model 730 may include a plurality of FCLs and a plurality of activation layers. The FCL has an input node and an output node, and performs an operation on data input via the input node by using an internal weight and outputs the result of the operation to the next layer via the output node.

The activation layer may assign non-linear characteristics to an output result of the previous layer. The activation layer may use an activation function. Although FIG. 7 illustrates a Leaky ReLU (Rectified Linear Unit) as the activation function, it is understood that the disclosure is not limited thereto and, for example, the activation function may include sigmoid function, Tanh function, ReLU function, etc.

In addition, the number of FCLs and the number of activation layers illustrated in FIG. 7 are merely examples, and the plurality of FCLs may be continuously connected, or the plurality of activation layers may be continuously connected.

A predetermined number of input values 240 may be input to an input layer 731 of the machine learning model 730, and in an embodiment, a value 710 indicating the number of non-zero coefficients in quantized transform coefficients may be further input to the input layer 731 in addition to the input values 240. The number of input nodes of the input layer 731 may be the same as that of pieces of data input to the input layer 731.

Element values which will be included in the quantization table 250 may be output from an output layer 739 of the machine learning model 730, and the number of output nodes of the output layer 739 may be the same as that of elements included in the quantization table 250. For example, when a size of the quantization table 250 is 8×8, the number of elements included in the quantization table 250 is 64, and accordingly, the number of output nodes of the output layer 739 may also be 64.

Figure 8:
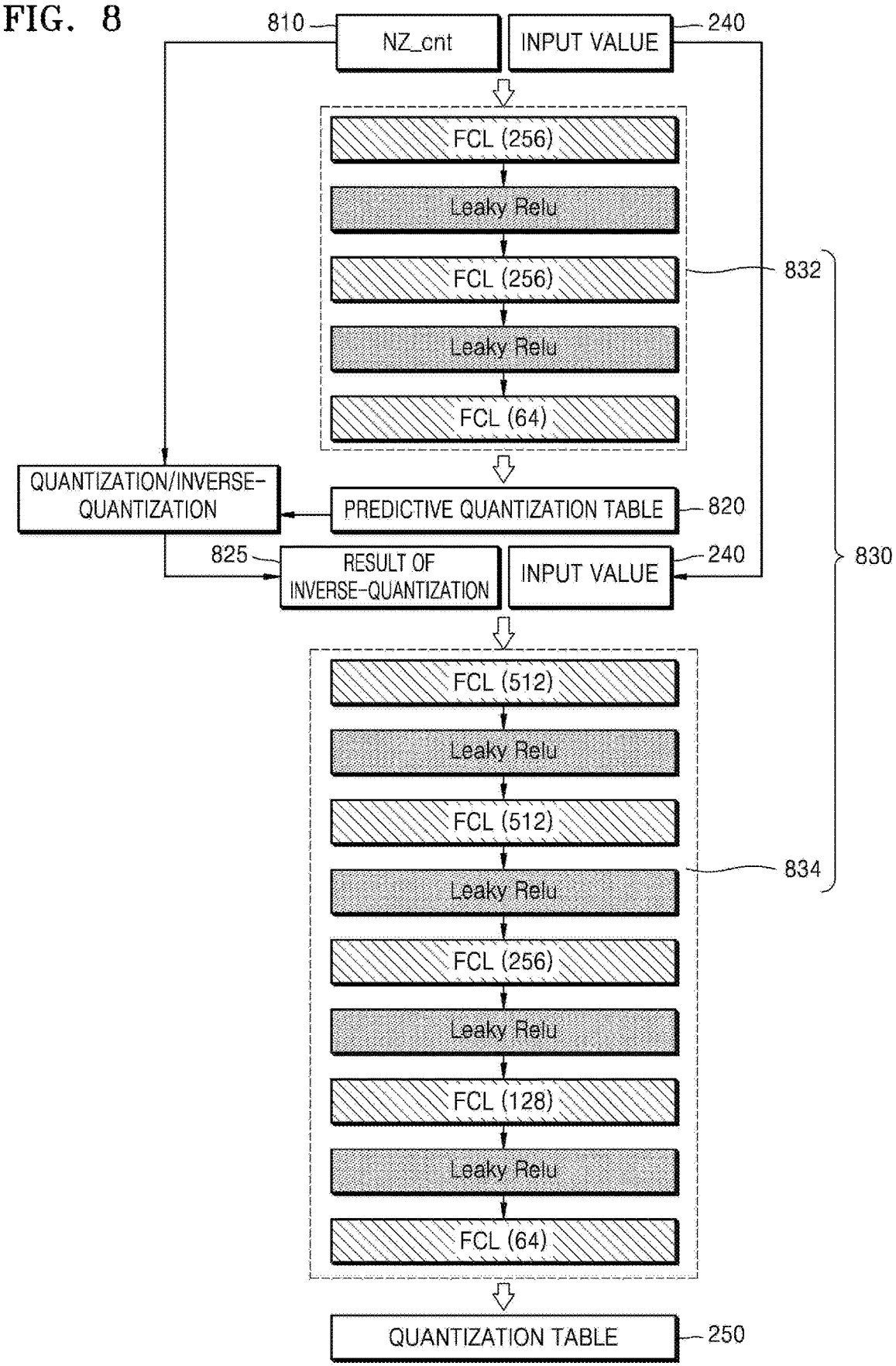
FIG. 8 is a diagram for explaining a structure of a machine learning model according to another embodiment.

FIG. 8 is a diagram for explaining a structure of a machine learning model 830 according to another embodiment.

Referring to FIG. 8, the machine learning model 830 may include a first sub-model 832 and a second sub-model 834. The first sub-model 832 outputs a predictive quantization table 820, and the second sub-model 834 outputs the quantization table 250.

Like the machine learning model 730 illustrated in FIG. 7, the first sub-model 832 may include a plurality of FCLs and a plurality of activation layers. The input values 240 and a value 810 indicating the number of non-zero coefficients may be input to an input layer of the first sub-model 832, and the predictive quantization table 820 may be output from an output layer of the first sub-model 832. The number of input nodes of the input layer of the first sub-model 832 may be the same as a value obtained by adding the number of values 810 indicating the number of non-zero coefficients to the number of the input values 240. In addition, the number of output nodes of the output layer of the first sub-model 832 may be the same as that of elements included in the predictive quantization table 820. A size of the predictive quantization table 820 may be the same as that of the quantization table 250 output from the second sub-model 834.

The second sub-model 834 may include a plurality of FCLs and a plurality of activation layers. The second sub-model 834 receives the input values 240 input to the first sub-model 832 and a result of quantizing and inversely quantizing the value 810 indicating the number of non-zero coefficients and the input values 240 by using the predictive quantization table 820. The number of input nodes of an input layer of the second sub-model 834 may be the same as a value obtained by summing the number of the input values 240, the number of values 810 indicating the number of non-zero coefficients, and the number of pieces of data 825 generated as a result of inverse-quantization. The output layer of the second sub-model 834 outputs element values, which will be included in the quantization table 250, via output nodes.

The machine learning model 830 illustrated in FIG. 8 outputs a predictive quantization table 820 from the first sub-model 832 and inputs the result of quantizing and inversely quantizing by using the predictive quantization table 820 to the second sub-model 834 again. Accordingly, the machine learning model 830 may generate the quantization table 250 having high efficiency in encoding, as compared to a machine learning model corresponding to one sub-model (for example, the machine learning model 730 illustrated in FIG. 7).

Figure 9:
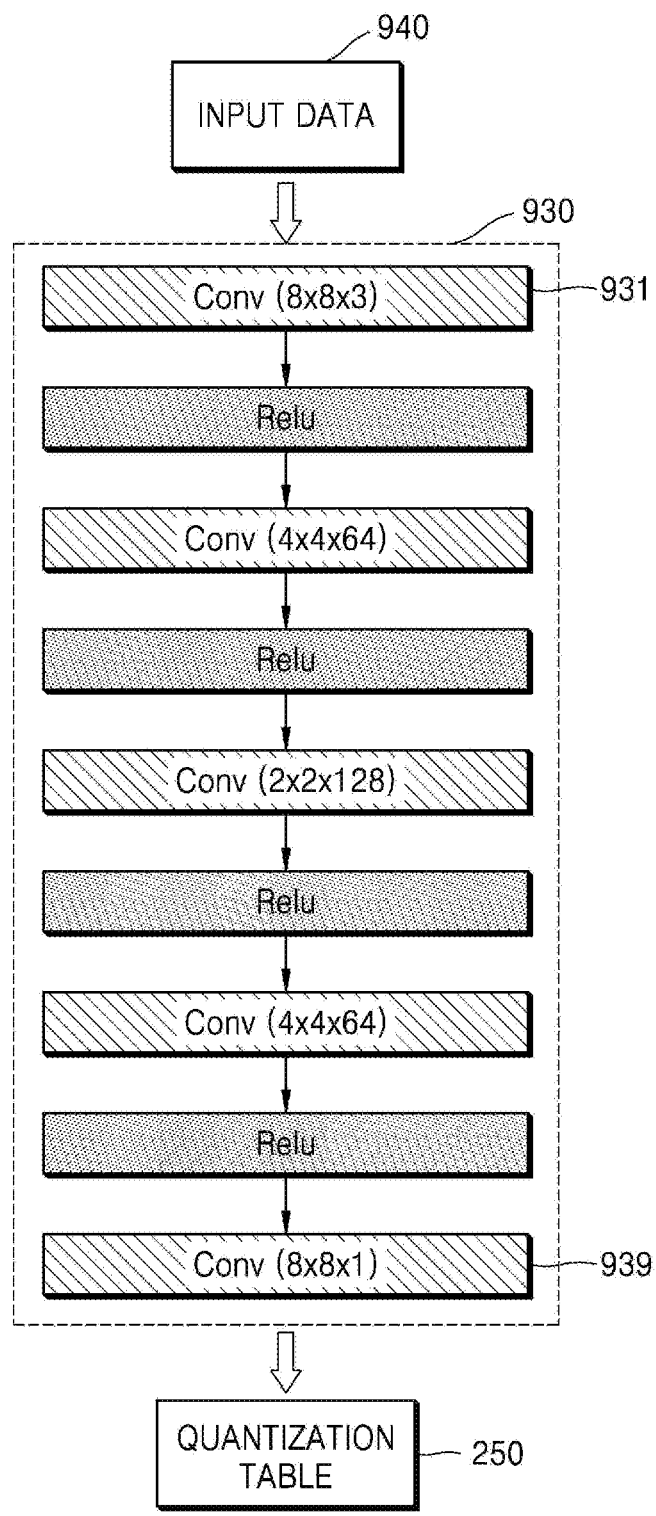
FIG. 9 is a diagram for explaining a structure of a machine learning model according to another embodiment.

FIG. 9 is a diagram for explaining a structure of a machine learning model 930 according to another embodiment.

The machine learning model 930 may include a plurality of convolution layers and a plurality of activation layers in a CNN network. The convolution layer performs convolution processing on input data with a filter kernel of a predetermined size and outputs a result of convolution processing to the next layer.

In FIG. 9, an input convolution layer 931 has 8×8×3 dimension information, which means that the input convolution layer 931 performs convolution processing on input data with 3 filter kernels of an 8×8 size. It is understood that the size and number of filter kernels used in each convolution layer is not limited to that illustrated in FIG. 9 and may vary in various embodiments.

The input convolution layer 931 receives two-dimensional data as input data 940. In this regard, the input data 940 may include at least one of the plurality of transform coefficient groups 230, the input values 240 two-dimensionally obtained from the plurality of transform coefficient groups 230, the plurality of patches 220, or the image 210 described above.

According to an embodiment, an output layer 939 of the machine learning model 930 has to generate the quantization table 250 of a predetermined size, and thus, two-dimensional data input as the input data 940 also has to have a predetermined size. Specifically, in a convolution layer, convolution processing is performed on two-dimensional data according to a predetermined stride by using a filter kernel of a predetermined size, and thus, a size of output data may differ according to a size of input two-dimensional data. Accordingly, when a size of the input data 940 for the machine learning model 930 including a plurality of convolution layers is greater or less than a predetermined size, the encoder 110 may perform downsampling or upsampling on the input data 940 so that the size of the input data 940 is the same as the predetermined size.

Figure 10:
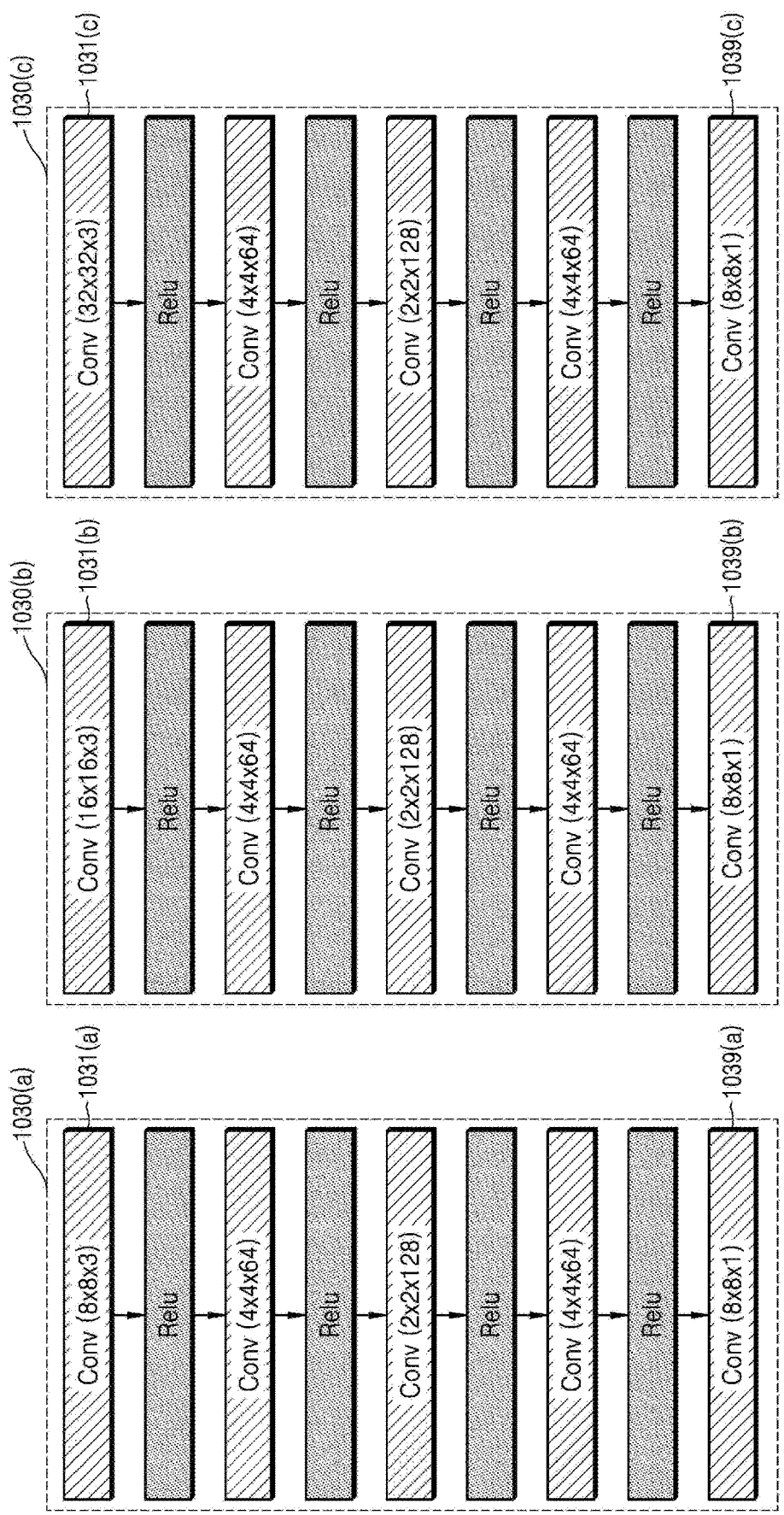
FIG. 10 is a diagram for explaining that one of a plurality of machine learning models may be used to generate a quantization table.

In an embodiment, as illustrated in FIG. 10, the machine learning model 130 may include a plurality of machine learning models 1030(a), 1030(b), and 1030(c) capable of receiving pieces of two-dimensional data of different sizes. The encoder 110 may input two-dimensional data to a machine learning model corresponding to a size of the two-dimensional data from among the plurality of machine learning models 1030(a), 1030(b), and 1030(c) and generate the quantization table 250 accordingly. Sizes of filter kernels and/or sizes of strides used in input layers 1031(a), 1031(b), and 1031(c) of the plurality of machine learning models 1030(a), 1030(b), and 1030(c) may be different from one another.

Although sizes of pieces of data input to the input layers 1031(a), 1031(b), and 1031(c) of the plurality of machine learning models 1030(a), 1030(b), and 1030(c) illustrated in FIG. 10 are different from one another, sizes of pieces of data output from output layers 1039(a), 1039(b), and 1039(c) of the plurality of machine learning models 1030(a), 1030(b), and 1030(c) may be the same as one another.

Figure 11:
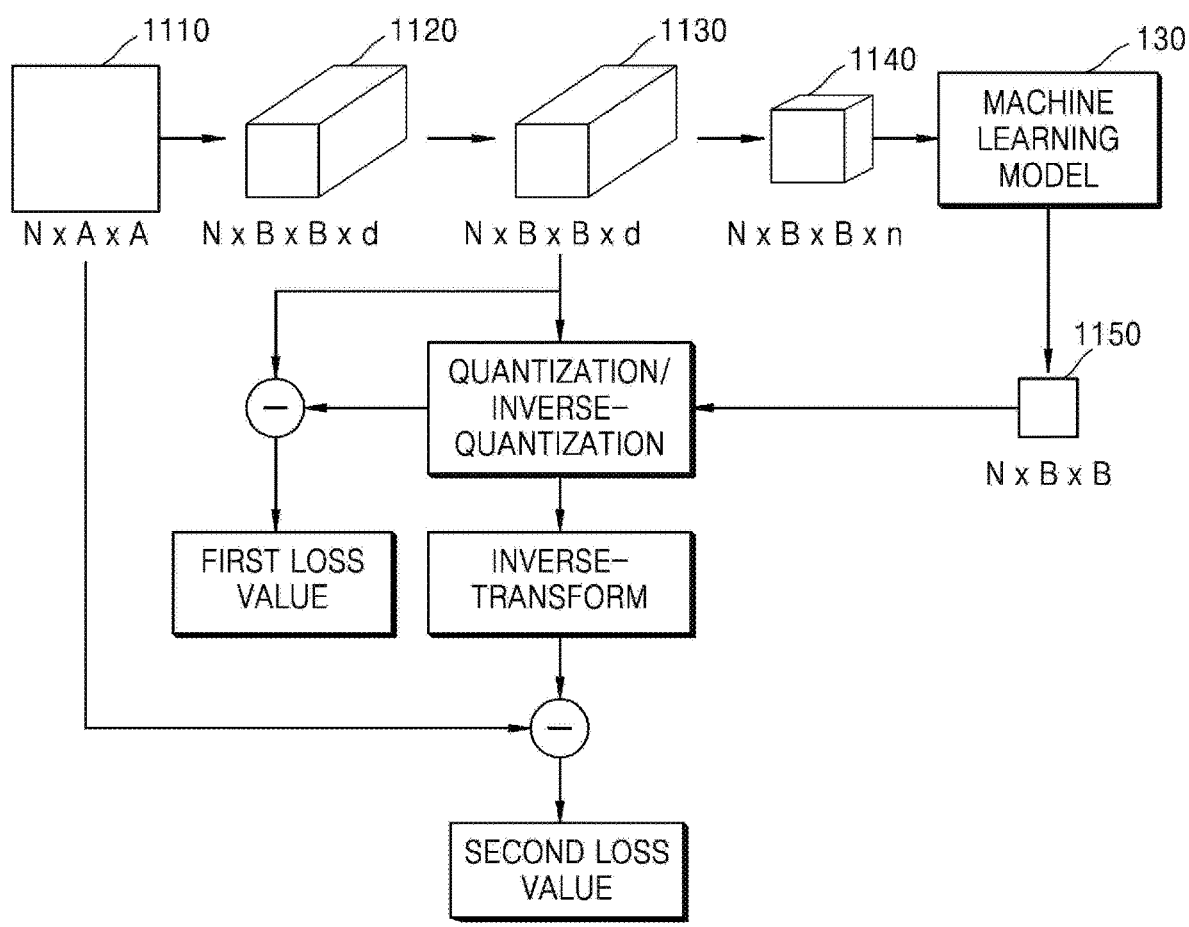
FIG. 11 is a diagram for explaining a method of training a machine learning model, according to an embodiment.

FIG. 11 is a diagram for explaining a method of training the machine learning model 130, according to an embodiment. In FIG. 11, N, which denotes the number of batches, may be an integer equal to or greater than 1.

A plurality of training patches 1120 may be extracted from a training image 1110, and frequency transform may be performed on the plurality of training patches 1120 to generate a plurality of training transform coefficient groups 1130. A plurality of training input values 1140 obtained based on the plurality of training transform coefficient groups 1130 are input to the machine learning model 130, and a training quantization table 1150 is output from the machine learning model 130. Transform coefficients corresponding to the training image 1110 are quantized and inversely quantized by using the training quantization table 1150. In addition, a first loss value corresponding to a difference between transform coefficients before quantization and transform coefficients after inverse-quantization is calculated.

In addition, transform coefficients corresponding to the training image 1110 are quantized and inversely quantized by using the training quantization table 1150 and then are inversely transformed into a spatial domain to reconstruct a training image. Further, a second loss value corresponding to a difference between the reconstructed training image and the training image 1110 is calculated.

As the first loss value and the second loss value, one of a $L^1$-norm value, a $L^2$-norm value, a SSIM (Structural Similarity) value, a PSNR-HVS (Peak Signal-To-Noise Ratio-Human Vision System) value, a MS-SSIM (Multiscale-SSIM) value, a VIF (Variance Inflation Factor) value, and a VMAF (Video Multimethod Assessment Fusion) value, or a result of combining two or more from among those values may be used.

According to an embodiment, the machine learning model 130 may be trained to decrease at least one of the first loss value or the second loss value. For example, the machine learning model 130 may be trained to minimize at least one of the first loss value and the second loss value. At least one of the first loss value or the second loss value may be input to the machine learning model 130, and the machine learning model 130 may update an internal weight to decrease at least one of the first loss value or the second loss value.

Further, according to an embodiment, training transform coefficients corresponding to the training image 1110 may be quantized by using the training quantization table 1150 output by inputting the training input values 1140 corresponding to the training image 1110 to the machine learning model 130. Then, a third loss value may be calculated based on whether quantized training transform coefficients correspond to 0 or not. When quantized training transform coefficients are not 0, the third loss value may increase in a direction from low frequency to high frequency.

The third loss value may be calculated according to Equation 1 below.

$$\text{Mean of } R = \frac{1}{64} \sum_{i,j} \left( \frac{-1}{|\hat{c}_{ij}| + 10^{-5}} + 10^5 \right) T_{ij} \text{ for all patches} \quad \text{[Equation 1]}$$

In Equation 1 above, $\tilde{c}_{ij}$ denotes a transform coefficient in a location (i, j) included in a quantized transform coefficient group, and $T_{ij}$ denotes a weight corresponding to the location (i, j) included in the quantized transform coefficient group. Weights in a case where a size of the quantized transform coefficient group is 8×8 are illustrated in FIG. 12.

Referring to FIG. 12, weighting increases in a direction toward the bottom right so that values corresponding to high frequency from among result values of quantization are as close to 0 as possible. When $\tilde{c}_{ij}$ is not 0, R in Equation 1 above increases, and as $\tilde{c}_{ij}$ corresponds to high frequency, R increases more as compared to low frequency.

According to an embodiment, a final loss value (Loss) for training of the machine learning model 130 may be calculated according to Equation 2 below.

$$\text{Loss} = w_0 L_{rate} + w_1 L_{dist} + w_2 L_{reg} \quad \text{[Equation 2]}$$

In Equation 2 above, each of w0, w1, and w2 is a previously set value as a weight applied to a loss value, Lrate is a third loss value, and Ldist is a first loss value or a second loss value or a value obtained by combining the first loss value and the second loss value. Lreg, which is a normalization term, is a value for preventing overfitting of the machine learning model 130. Lreg may be calculated with a sum of squares of internal weights of all layers of the machine learning model 130.

The machine learning model 130 may be trained to decrease the final loss value. For example, the machine learning model 130 may be trained to minimize the final loss value.

The first loss value and the second loss value are calculated to prevent degradation of image quality of an image reconstructed by quantizing transform coefficients by using a quantization table and then inversely quantizing and inversely transforming a result of the quantization. The third loss value is calculated to decrease the number of bits included in a bitstream, that is, to include 0 as much as possible in the quantized result. Accordingly, the machine learning model 130 may be trained to decrease a bitrate while reducing degradation of picture quality due to quantization.

Figure 13:
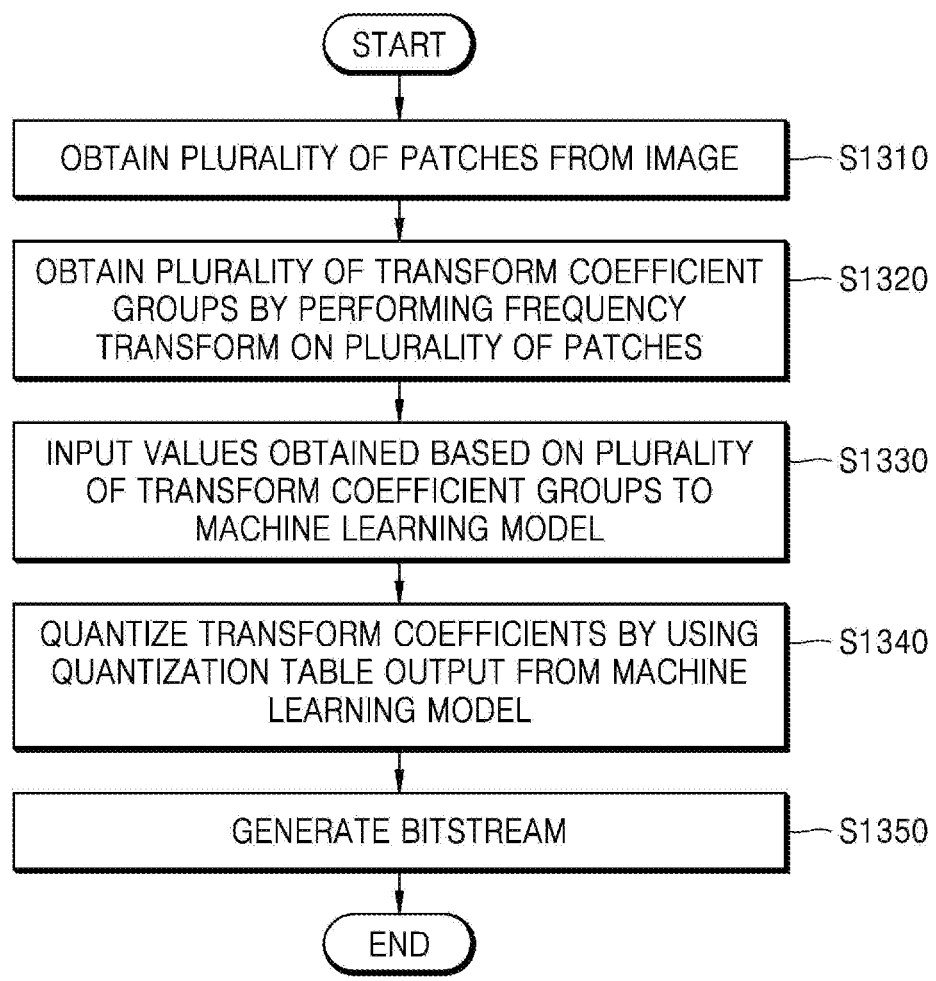
FIG. 13 is a flowchart for explaining a method of encoding an image, according to an embodiment.

FIG. 13 is a flowchart for explaining a method of encoding an image, according to an embodiment.

Referring to FIG. 13, in operation S1310, the image encoding apparatus 100 obtains a plurality of patches from an image. The plurality of patches may have a pre-set size.

In operation S1320, the image encoding apparatus 100 performs frequency transform on the plurality of patches and obtains a plurality of transform coefficient groups. A size of each of the plurality of transform coefficient groups may be the same as a size of the patch.

In operation S1330, the image encoding apparatus 100 inputs input values obtained based on the plurality of transform coefficient groups to the machine learning model 130. Transform coefficients themselves included in the plurality of transform coefficient groups may correspond to the input values, or values calculated by using transform coefficients included in the plurality of transform coefficient groups may correspond to the input values.

In operation S1340, the image encoding apparatus 100 quantizes transform coefficients corresponding to the image by using a quantization table output from the machine learning model 130. The image encoding apparatus 100 may quantize, by using a quantization table, transform coefficients within the plurality of transform coefficient groups obtained by performing frequency transform on the plurality of patches, or may quantize, by using a quantization table, transform coefficients obtained by performing frequency transform on the image by using an arbitrary method.

In operation S1350, the image encoding apparatus 100 generates a bitstream including data generated as a result of quantization and information about the quantization table.

While generating a bitstream meeting a certain standard (for example, JPEG standard), the image encoding apparatus 100 may include information about the quantization table in the corresponding bitstream. For example, the image encoding apparatus 100 may include information about a quantization table generated in the machine learning model 130 in a marker segment within a bitstream of compressed image data as quantization table-specifications.

Figure 14:
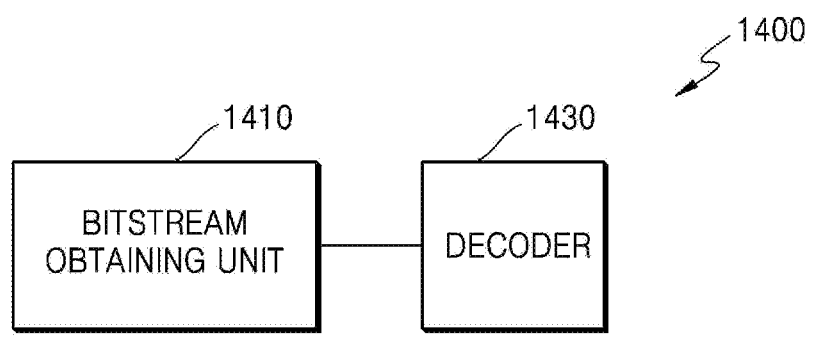
FIG. 14 is a block diagram illustrating configurations of an image decoding apparatus according to an embodiment.

FIG. 14 is a block diagram illustrating configurations of an image decoding apparatus 1400 according to an embodiment.

Referring to FIG. 14, the image decoding apparatus 1400 according to an embodiment may include a bitstream obtaining unit 1410 (e.g., bitstream obtainer) and a decoder 1430.

The bitstream obtaining unit 1410 may obtain a bitstream generated as a result of encoding an image, and the decoder 1430 may decode an image based on information included in the bitstream. The bitstream obtaining unit 1410 and the decoder 1430 may be implemented as at least one processor and may perform an image decoding operation by executing a program stored in a memory.

The image decoding apparatus 1400 may include a central processor for controlling the bitstream obtaining unit 1410 and the decoder 1430. Alternatively, the bitstream obtaining unit 1410 and the decoder 1430 may each be driven by an individual processor, and the image decoding apparatus 1400 may operate as a whole as the individual processors mutually operate. Alternatively, the bitstream obtaining unit 1410 and the decoder 1430 may be controlled by the control of an external processor of the image decoding apparatus 1400.

The image decoding apparatus 1400 may include one or more data storage units (e.g., data storages) in which input data and output data of the bitstream obtaining unit 1410 and the decoder 1430 are stored. The image decoding apparatus 1400 may include a memory controller for controlling data input and output of the data storage unit.

To reconstruct an image for image decoding, the image decoding apparatus 1400 may perform an image decoding operation by jointly operating with an internal decoding processor or an external decoding processor. An internal decoding processor of the image decoding apparatus 1400 according to an embodiment may perform basic image decoding operations as an individual processor. Also, the image decoding apparatus 1400, a central operating apparatus, or a graphic operating apparatus may include an image decoding processing module to perform the basic image decoding operations.

The bitstream obtaining unit 1410 may obtain a bitstream generated as a result of encoding an image and may obtain information about a quantization table and data generated as a result of quantizing an image from the bitstream. The quantization table may correspond to a quantization table generated through the machine learning model 130 by the image encoding apparatus 100 described above.

The decoder 1430 may inversely quantize the data generated as a result of quantization according to the quantization table and may reconstruct an image by inversely transforming an inversely quantized result into a spatial domain.

When the image encoding apparatus 100 encodes an image by using a predetermined quantization table meeting a certain standard (for example, JPEG standard) instead of generating a quantization table by using the machine learning model 130, the image decoding apparatus 1400 according to an embodiment may generate a new quantization table through the machine learning model 130.

In an embodiment, the decoder 1430 may reconstruct an image by using a quantization table obtained based on a bitstream and then may generate a new quantization table through the machine learning model 130 with the reconstructed image. The decoder 1430 may reconstruct an image again by using the new quantization table.

Specifically, the decoder 1430 may inversely quantize a quantization result value included in a bitstream by using a quantization table obtained based on the bitstream, and may inversely transform a result value of the inverse-quantization into a spatial domain. In addition, the decoder 1430 may obtain a plurality of patches from a reconstructed image generated as a result of inverse-transform, and may obtain a plurality of transform coefficient groups by performing frequency transform on the plurality of patches. The decoder 1430 may obtain a quantization table by inputting input values corresponding to the plurality of transform coefficient groups to the machine learning model 130 described above. In addition, the decoder 1430 may inversely quantize a quantization result value included in a bitstream again by using a newly generated quantization table, and may reconstruct an image again by inversely transforming a result value of the inverse-quantization into a spatial domain. A process in which the decoder 1430 generates a quantization table through the machine learning model 130 is the same as or similar to the above-described process in which the image encoding apparatus 100 generates a quantization table through the machine learning model 130\.

The image encoding apparatus 100 and the image decoding apparatus 1400 according to an embodiment may be included in a smartphone, a tablet personal computer (PC), a desktop PC, server, a mobile device, a portable multimedia player, a television, a smartwatch, a smartglass server, etc.

Training of the machine learning model 130 stored in the image encoding apparatus 100 and/or the image decoding apparatus 1400 may be performed in various apparatuses.

For example, training of the machine learning model 130 may be performed in an external apparatus (for example, a server, etc.), and the trained machine learning model 130 may be stored in the image encoding apparatus 100 and the image decoding apparatus 1400.

By way of another example, while the machine learning model 130 is stored in the image encoding apparatus 100 and the image decoding apparatus 1400, training of the machine learning model 130 may be performed in the image encoding apparatus 100 and the image decoding apparatus 1400.

Alternatively, for example, training of the machine learning model 130 may be performed in an external apparatus (for example, a server, etc.), and then, information indicating an internal weight of the machine learning model 130 may be transmitted from the external apparatus to the image encoding apparatus 100 and the image decoding apparatus 1400 through a communication network. The image encoding apparatus 100 and the image decoding apparatus 1400 may operate the previously stored machine learning model 130 according to the received internal weight information.

One or more embodiments of the disclosure may be written as computer-executable programs, and the written programs may be stored in a medium.

The medium may permanently store the computer-executable programs or may temporarily store the computer-executable programs for execution or downloading. In addition, the medium may be any recording means or storage means having a single hardware or several pieces of hardware combined and is not limited to a medium directly connected to a computer system. For example, the medium may be distributed over a network. The medium may be a configuration of storing program instructions, and examples thereof include magnetic media such as a hard disk, a floppy disk, and a magnetic tape, optical recording media such as compact disk-read only memory (CD-ROM) and digital versatile disk (DVD), magneto-optical media such as a floptical disk, and read-only memory (ROM), random access memory (RAM), flash memory, etc. Other examples of the medium include recording media or storage media managed by an app store distributing applications or a site, a server, etc., supplying or distributing other various types of software.

In an encoding apparatus and method of an image using a quantization table adaptive to the image, according to one or more embodiments, an image may be encoded to have high resolution compared to a low bitrate.

It is understood further that effects that may be accomplished by the encoding apparatus and method of an image using a quantization table adaptive to the image, according to one or more embodiments, are not limited to those explicitly described above, and other effects may be clearly understood by one of ordinary skill in the art from the descriptions.

While one or more embodiments have been described with reference to the figures, embodiments described herein should be considered in a descriptive sense only and not for purposes of limitation, and it will be understood by those of ordinary skill in the art that various changes in form and details may be made therein without departing from the spirit and scope as defined by the following claims.

What is claimed is:

1. A method of encoding an image, the method comprising:
    obtaining a plurality of patches from the image;
    obtaining a plurality of transform coefficient groups respectively corresponding to the plurality of patches;
    inputting, to a machine learning model trained to output a quantization table, input values corresponding to transform coefficients comprised in each of the plurality of transform coefficient groups;
    quantizing transform coefficients corresponding to the image by using the quantization table output from the machine learning model; and
    generating a bitstream comprising data generated as a result of the quantizing and information about the quantization table.

2. The method of claim 1, wherein:
    the machine learning model comprises a first fully connected layer (FCL) receiving the input values and a second FCL outputting element values comprised in the quantization table; and
    a number of input nodes of the first FCL corresponds to a number of the input values, and a number of output nodes of the second FCL corresponds to a number of elements comprised in the quantization table.

3. The method of claim 1, wherein the obtaining the plurality of patches comprises obtaining the plurality of patches by splitting the image into split regions of a predetermined size.

4. The method of claim 3, wherein adjacent split regions, among the split regions of the predetermined size, adjacent to each other in the image partially overlap.

5. The method of claim 1, wherein the obtaining the plurality of patches comprises obtaining the plurality of patches by alternately allocating pixels comprised in the image to the plurality of patches, respectively, in a predetermined order.

6. The method of claim 1, further comprising:
classifying the transform coefficients comprised in each of the plurality of transform coefficient groups according to locations of the transform coefficients within each of the transform coefficient groups and obtaining the input values based on the classified transform coefficients.

7. The method of claim 6, wherein the obtaining the input values comprises obtaining at least one of a maximum value, a minimum value, or an average value of the classified transform coefficients from each of the locations in the transformation coefficient groups as the input values.

8. The method of claim 1, wherein:
the machine learning model is trained to decrease a loss value calculated, after quantizing and inversely quantizing training transform coefficients corresponding to a training image by using a training quantization table, based on a difference between the training transform coefficients before the quantizing and the inversely quantized training transform coefficients; and
the training quantization table is obtained by inputting training input values corresponding to the training image to the machine learning model.

9. The method of claim 1, wherein:
the machine learning model is trained to decrease a loss value calculated, after quantizing and inversely quantizing training transform coefficients corresponding to a training image by using a training quantization table and reconstructing the training image by inversely transforming the inversely quantized training transform coefficients into pieces of data in a spatial domain, based on a difference between the reconstructed training image and the training image; and
the training quantization table is obtained by inputting training input values corresponding to the training image to the machine learning model.

10. The method of claim 1, wherein:
the machine learning model is trained to decrease a loss value calculated, after quantizing training transform coefficients corresponding to a training image by using a training quantization table, based on whether the quantized training transform coefficients are 0 or not; and
the training quantization table is obtained by inputting training input values corresponding to the training image to the machine learning model.

11. The method of claim 10, wherein, based on the quantized training transform coefficients not being 0, the loss value increases in a direction from low frequency to high frequency.

12. The method of claim 1, wherein the machine learning model comprises:
a first sub-model configured to receive the input values and output a predictive quantization table; and
a second sub-model configured to receive a result of quantizing and inversely quantizing the input values with the predictive quantization table and the input values and outputting the quantization table.

13. An apparatus for encoding an image, the apparatus comprising:
at least one memory storing a machine learning model, trained to output a quantization table, and at least one instruction; and
at least one processor configured to execute the at least one instruction to:
obtain a plurality of patches from the image;
obtain a plurality of transform coefficient groups respectively corresponding to the plurality of patches;
input, to the machine learning model, input values corresponding to transform coefficients comprised in each of the plurality of transform coefficient groups;
quantize transform coefficients corresponding to the image by using the quantization table output from the machine learning model; and
generate a bitstream comprising data generated as a result of the quantizing and information about the quantization table.

14. The apparatus of claim 13, wherein:
the machine learning model comprises a first fully connected layer (FCL) receiving the input values and a second FCL outputting element values comprised in the quantization table; and
a number of input nodes of the first FCL corresponds to a number of the input values, and a number of output nodes of the second FCL corresponds to a number of elements comprised in the quantization table.

15. The apparatus of claim 13, wherein the at least one processor is further configured to execute the at least one instruction to obtain the plurality of patches by splitting the image into split regions of a predetermined size.

16. The apparatus of claim 13, wherein the at least one processor is further configured to execute the at least one instruction to obtain the plurality of patches by alternately allocating pixels comprised in the image to the plurality of patches, respectively, in a predetermined order.

17. The apparatus of claim 13, wherein the at least one processor is further configured to execute the at least one instruction to classify the transform coefficients comprised in each of the plurality of transform coefficient groups according to locations of the transform coefficients within each of the transform coefficient groups and obtain the input values based on the classified transform coefficients.

* * * * *